May 5, 1936.  H. E. IVES  2,039,648
CAMERA FOR MAKING PARALLAX PANORAMAGRAMS
Original Filed Dec. 30, 1930   2 Sheets-Sheet 1
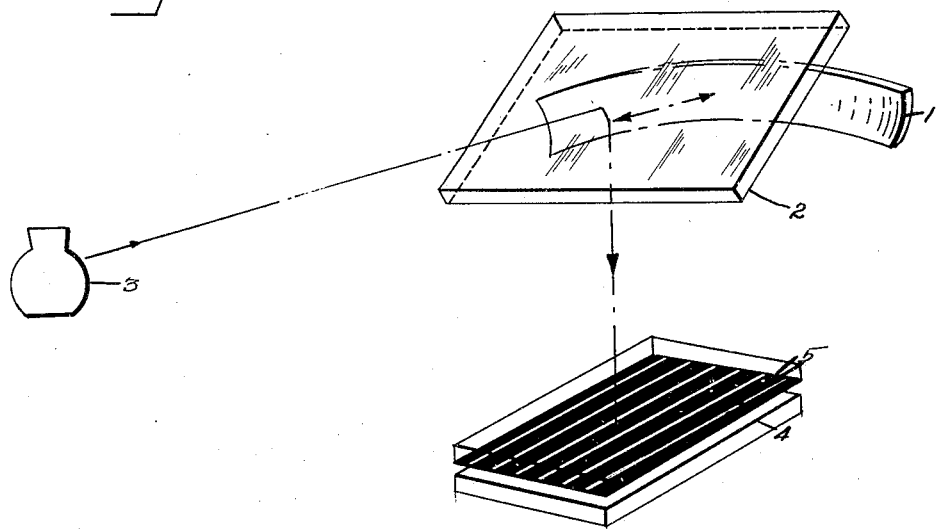
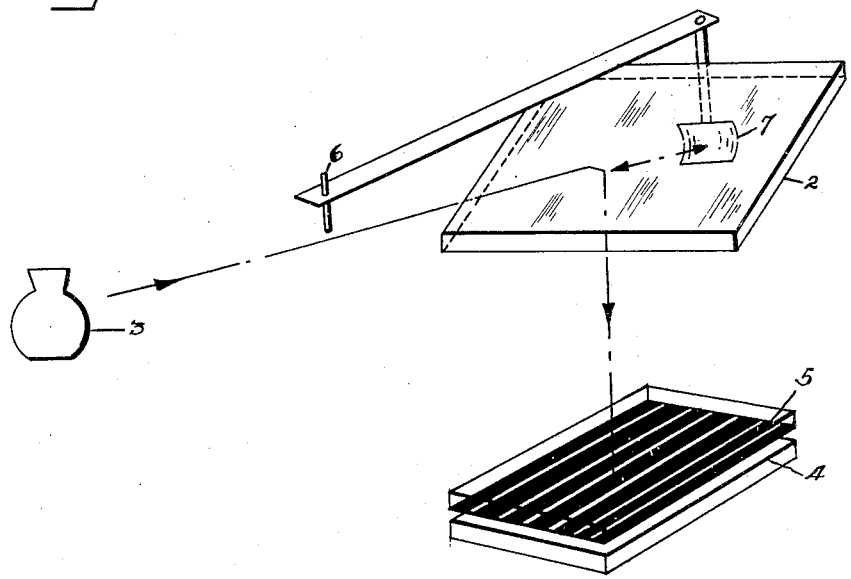
INVENTOR
Herbert E. Ives
BY
Harry L. Dodson
ATTORNEY May 5, 1936. H. E. IVES 2,039,648

CAMERA FOR MAKING PARALLAX PANORAMAGRAMS

Original Filed Dec. 30, 1930   2 Sheets-Sheet 2

FIG. 3.

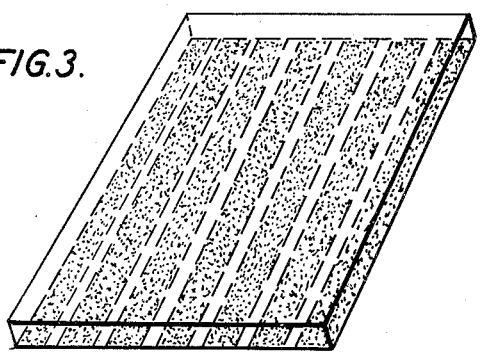

SEMI-TRANSPARENT MIRROR CONSISTING OF GLASS PLATE FULLY SILVERED WITH SILVER COATING REMOVED IN FINE STRIPS. SILVER COATING IS REPRESENTED BY DOTTED AREAS.

FIG. 4.

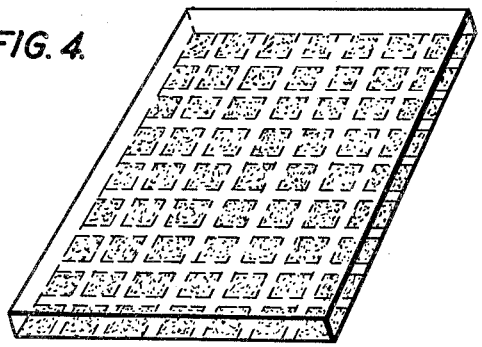

SEMI-TRANSPARENT MIRROR CONSISTING OF GLASS PLATE FULLY SILVERED WITH SILVER COATING REMOVED TO LEAVE PATCHES OF COATING. SILVER COATING IS REPRESENTED BY DOTTED AREAS.

FIG. 5.

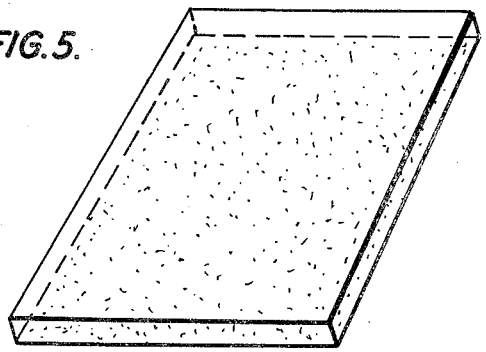

SEMI-TRANSPARENT MIRROR CONSISTING OF GLASS PLATE THINLY SILVERED. THIN COATING OF SILVER IS REPRESENTED BY DOTTED AREA.

INVENTOR.
Herbert E. Ives
BY Harvey Lea Dodson
ATTORNEY.

Patented May 5, 1936

2,039,648

UNITED STATES PATENT OFFICE 2,039,648

CAMERA FOR MAKING PARALLAX PANORAMAGRAMS

Herbert E. Ives, Montclair, N. J., assignor to The Perser Corporation, New York, N. Y., a corporation of New York Refiled for abandoned application Serial No. 503,733, December 30, 1930. This application May 6, 1933, Serial No. 669,677

10 Claims. (Cl. 95—18)

This invention relates to apparatus for making parallax panoramagrams (a term I have employed to describe pictures showing relief through a large range of angles and distances as fully described in an application, Serial No. 503,733, filed December 30, 1930, which application was abandoned by inadvertence).

In my Patent No. 1,882,424, I have described a method of making such pictures, the essential features of which is a lens of diameter large compared with the distance between the eyes. This lens is used in conjunction with an opaque line grating or a structure of fine cylindrical ridges at a small distance in front of the photographic plate, whose function is to divide the picture into narrow strips each of which are units of a minute panorama, the successive linear elements of which are due to different elements of the lens, and hence to different points of view of the object photographed. The resultant negatives may be utilized to make relief pictures in either of two ways. They may be used to print pictures by contact which are then placed before and slightly separated from another opaque grating for viewing, or positives may be made by projectives printing, using a similar large lens, both negative and positive plate having opaque line gratings or cylindrical ridges interposed between them and the lens.

In order to fully realize the possibilities of this method of making relief pictures it is necessary to have a lens of such large size and short focal length that the technical problems of manufacture presents great difficulty. Thus a desirable design of lens would be one of two feet diameter and two feet focal length, and to those familiar with the problems of lens design it is clear that such a lens would be difficult to construct and extremely costly. It is the object of my present invention to provide a simple and less costly means of achieving the same results as those given by the large diameter lens.

My means for accomplishing the foregoing object of my invention may be more readily comprehended by having reference to the accompanying drawings, which are hereunto annexed and made a part of this specification, in which—

Fig. 1 is a diagrammatic view showing how my invention may be utilized; and

Fig. 2 is a modified form of the same.

Fig. 3 is a detail view of one kind of semi-transparent mirror to be used with my invention; Fig. 4 is a similar view of a modified form of the same.

Fig. 5 is a similar view of a semi-transparent mirror thinly silvered.

Similar reference numerals refer to like parts throughout the entire description.

My invention consists, as shown in the drawings, of a large concave mirror or strip therefrom. As is well known, a concave mirror, of spherical, ellipsoidal, or paraboloidal curvature, has the property of forming images, as does a lens, but utilizes only a single figured surface whereby the expense of manufacture is greatly reduced. A characteristic limitation of such a mirror is that the incident and reflected rays occupy the same space, so that some means for separating them is necessary. For this purpose I provide a 45° semi-transparent plate mirror 2 in the path of the incident rays extending the whole length of the mirror 1. The action of the strip of concave mirror 1 is thus as follows: Light from the object 3 passing through the plane of the transparent mirror 2 is reflected from the concave mirror strip 1 to the semi-transparent mirror 2, and from this mirror it is again reflected to form an image on the sensitive plate 4 through the grating 5.

The result of this procedure is to produce on the sensitive plate 4 an image exactly like that made by the large lens described in my Patent No. 1,882,424, issued October 11, 1932. This is for the reason that an even number of image inversions have been introduced, one at each mirror, leaving the image unaltered. Consequently the photographic negative obtained on the sensitive plate 4 are to be treated exactly as the negative obtained with the large lens. They may be used either for colored printing for later combination with a grating on the proper side for producing stereoscopic relief, or they may be rephotographed by the same similar apparatus as that shown in Figure 1.

It is of interest to note that just as either a moving lens or a large lens can be used to make parallax panoramagrams, so a moving mirror apparatus can be constructed by a slight modification of the large mirror scheme. This modification is illustrated in Figure 2. It differs from the apparatus of Figure 1 in that in place of a large stationary concave mirror, it uses a small concave mirror 7, of the same focal length as the large mirror, arranged, however, to be swung, during the exposure, about an axis 6, through its center of curvature. Upon the completion of its path, the mirror 7 has of course given the sensitive plate 4 the equivalent of the exposure from the single large concave mirror 1. (This assumes that the large mirror is of spherical curvature. If a parabolic mirror is assumed, the path of the small mirror would not be accurately circular. Actually, since most objects photographed would be nearby, a spherical surface is as near correct as a paraboloid.)

Comparing this moving mirror device with moving lens devices, it is evident that the characteristic property of the mirror i. e. that it forms its image on the same side as the object—makes for a more compact and self-contained apparatus. The cost of the optical parts of a camera employing a small moving mirror would be much less than the cost of a large concave mirror. The advantage of short exposure time would, however, be sacrificed.

In the practical embodiment of the idea I use a semi-transparent mirror formed of a glass plate thinly silvered on the side towards the concave mirror, or a glass plate fully silvered on the same side, from which the silver has been partly removed so as to leave fine strips or patches of a size too small to be clearly defined in the final picture as clearly seen in the detail views, Figs. 3 and 4.

Having described my invention, what I regard as new and desire to secure by Letters Patent is:—

1. In a camera for making parallax panoramagrams, the combination of a concave mirror of a length large as compared with the distance between the eyes, and of approximately uniform width, with a semi-transparent mirror of approximately the same length arranged at 45° to the path of the incident light to reflect to one side the image formed by the concave mirror.

2. In a camera for making parallax panoramagrams, the combination of a concave mirror of a length comparable in length with the object to be photographed, and of approximately uniform width, with a semi-transparent mirror of approximately the same length arranged at 45° to the path of the incident light to reflect to one side the image formed by the concave mirror.

3. In a camera for making parallax panoramagrams, the combination of a concave mirror of a length greater than the distance between the eyes, and of approximately uniform width, with a semi-transparent mirror of approximately the same length arranged at 45° to the path of the incident light to reflect to one side the image formed by the concave mirror.

4. In a camera for making parallax panoramagrams, the combination of a long concave mirror, and of approximately uniform width, with a semi-transparent mirror of approximately the same length arranged at 45° to the path of the incident light to reflect to one side the image formed by the concave mirror.

5. In a camera for making parallax panoramagrams, the combination of a small concave mirror arranged to be swung about an axis through its center of curvature, with a semi-transparent mirror of approximately the length of the path of the small mirror arranged at 45° to the path of the incident light to reflect to one side the image formed by the concave mirror.

6. In a camera for making parallax panoramagrams, the combination of a small concave mirror arranged to be swung about the object to be photographed on an axis through its center of curvature, with a semi-transparent mirror of approximately the length of the path through which the small mirror is swung arranged at 45° to the path of the incident light to reflect to one side the image formed by the concave mirror.

7. In a camera for making parallax panoramagrams, the combination of a small concave mirror, means to swing said mirror about an axis through its center of curvature, with a semi-transparent mirror of approximately the length of the path through which the small mirror is swung arranged at 45° to the path of the incident light to reflect to one side the image formed by the concave mirror.

8. In a camera for making parallax panoramagrams, the combination of a small concave mirror, means to swing said mirror about the object to be photographed on an axis through its center of curvature, with a semi-transparent mirror of approximately the length of the path through which the small mirror is swung arranged at 45° to the path of the incident light to reflect to one side the image formed by the concave mirror.

9. In a camera for making parallax panoramagrams, the combination of a concave mirror, with a semi-transparent mirror placed obliquely in the path of the light from an object to be photographed incident upon the mirror to reflect to one side the image formed by the concave mirror.

10. In a camera for making parallax panoramagrams, the combination of a concave mirror, with a semi-transparent plane mirror placed obliquely in the path of the light from an object to be photographed incident upon the mirror to reflect to one side the image formed by the concave mirror.

HERBERT E. IVES.